3,826,662
REFRACTORY MIX FOR PATCHING THE REFRACTORY LINING IN A BLAST FURNACE CASTING FLOOR NETWORK
Gregory F. Paolini, Perry Hall, Md., assignor to Bethlehem Steel Corporation
No Drawing. Filed Feb. 17, 1972, Ser. No. 229,166
Int. Cl. C04b 35/52
U.S. Cl. 106—56                                    13 Claims

ABSTRACT OF THE DISCLOSURE

A trowellable patching mix consisting of about 60% to about 80% coke breeze, about 10% to about 30% fireclay and up to about 20% pitch. The coke breeze is crushed so that 90% of the particles will pass a ⅛ inch screen. The fireclay has a PCE of about 19 to about 24, and the pitch has a softening point between about 300° F. and about 340° F. The mix is blended with water to obtain a desired consistency.

BACKGROUND OF THE INVENTION

This invention is directed to a patching mix which when mixed with water is trowellable, and which contains a high percentage of carbon. The mix is suitable for repairing the refractory lining in the network of troughs, runners, dams, cinder falls and spouts in a blast furnace casting floor.

The network for conveying molten iron and slag from the hearth of a blast furnace to the appropriate iron ladles and slag pots comprises troughs, runners, dams, cinder falls and spouts. The troughs and runners can be cast iron, or steel boxes lined with carbon blocks which are covered with a refractory lining to increase the life of the carbon blocks and to prevent penetration of molten iron between the blocks to the steel boxes. The dams and cinder falls and spouts are also refractory lined to increase their life.

The refractory used in the lining is the least expensive fireclay which has sufficient refractoriness and physical and mechanical properties to offer some resistance to the high temperatures of the molten iron and slag and to resist the erosion action of the flowing hot metal. The refractory lining does wear and must be repaired. The cheapest fireclay-type mix which has adequate resistance to temperature and erosion is used to repair the refractory lining.

The prior art mixes used to repair the refractory lining are compounded from a siliceous-type fireclay which has a small amount of carbon added thereto. The mix must be rammed or gunned into place to adequately repair the refractory lining. Other types of fireclay with additives therein to make them air setting can be used; however, these mixes must also be rammed or gunned into place and are expensive.

Prior art attempts to make and use carbonaceous pastes for repairing lining in cupolas and furnace linings and troughs are exemplified in U.S. Pat. No. 3,303,031 issued Feb. 7, 1967 to Thomas E. Shields entitled "Carbonaceous Ramming Paste." These pastes are generally difficult to handle, have a short life, and require the addition of an agent to minimize evaporation and cannot be used after becoming dry.

It is an object of this invention to provide a water base patching mix for the refractory lining in a blast furnace casting floor network, which mix has long shelf life, is inexpensive, can be installed by hand-trowelling, can be stored and then rejuvenated by adding water thereto, if the mix dries out.

It is another object of this invention to provide a mix, having a high percentage of carbon, for patching the refractory lining in a blast furnace casting floor network.

DETAILED DESCRIPTION OF THE INVENTION

The patching mix of the invention consists of about 60% to about 80% carbon which can be in the form of particles of coke breeze, about 10% to about 30% fireclay and about 1% to about 20% pitch. The patching mix is blended with sufficient water to produce the consistency and the plasticity needed to hand-trowel the patching mix into the area which is being repaired and to adhere to the surrounding refractory lining until it has been "burned-in."

If the patching mix is made with less than 1% pitch, the mix loses some of its strength and can fail prematurely after "burning-in." Compositions of the patching mix which are high in pitch, for example, about 16% to 20%, have a tendency to shrink and crack because of the volatilization of the light constituents in the pitch by the high temperatures of the molten iron and slag. Any patching mix which contains more than 20% pitch is susceptible to premature failure due to the large amount of volatiles given off by the pitch at the high temperatures of molten iron and slag. It is, therefore, within the scope of this invention to make a patching mix containing about 1% to about 20% pitch.

The pitch can be coal pitch or petroleum pitch having a softening point within the temperature range of about 300° F. to about 340° F. when tested according to ASTM D2319, "Softening Point of Pitches (cube-in-air method)." It is, preferred, however, to use a coal pitch having a softening point within the temperature range of about 300° F. to about 325° F.

The fireclay which is added to the patching mix of the invention can be any one of several well known fireclays having typical chemical compositions listed below:

| | Percent |
|---|---|
| Alumina | About 15 |
| Silica | About 68 |
| Iron Oxide | About 1.5 |
| Titania | About 1.0 |
| Lime | About 0.2 |
| Magnesia | About 0.2 |
| Alkalies | About 2.0 |

While a typical siliceous fireclay composition is shown above, it must be understood that any type of fireclay can be used; however, it would not be economically feasible to use a high alumina type of fireclay. It has been found that a fireclay having a PCE (Pyrometric Cone Equivalent) of between about 19 to about 24 has sufficient refractoriness, bonding and resistance to erosion to be used in the patching mix of the invention.

Carbon in the form of particles of coke breeze is used as the main constituent of the patching mix. Coke breeze can have a carbon content of about 70% to about 92%, about 1.0% to 3.0% volatile matter, about 15% to about 25% ash and about 10% to about 20% moisture. The coke breeze, which is obtained by screening coke, is crushed to reduce the particle size sufficiently so that 90% of the particles will pass a ⅛ of an inch screen (U.S.S.).

As noted above, a patching mix consisting of 60% to 80% particles of coke breeze, 10% to 30% fireclay and up to 20% pitch can be used to repair the refractory lining in a blast furnace casting floor network. However, it has been found that a patching mix consisting of about 65% to about 75% partciles of coke breeze, about 15% to about 25% fireclay and about 1% to about 15% pitch forms a repaired section which has better resistance to the high temperatures and erosion reactions of molten iron and slag. For best results, it has been found that the patching mix can consist of about 68% to about 72% particles of coke breeze, about 18% to about 20% fireclay and about 8% to about 12% pitch. It is, therefore, preferred to use the latter composition to repair the refractory lining.

No matter which composition of the patching mix of the invention is used, the mix is a water based material which is hand-trowellable. The patching mix is blended with water in the following amounts about 20 gallons per ton of dry mix to about 40 gallons per ton of dry mix to obtain a consistency similar to stiff cement. The trowelling mix contains about 8% to about 16% water based on 100% total dry components added thereto. The patching mix is easily hand-trowelled or shoveled into place and can be as thin as two inches and as thick as eight inches. The patching mix is "burned-in" by placing an iron sheet over the trowelled-in mix and heated to a temperature range of between about 1200° F. to about 1800° F. for a time, usually about ½ hour to about 1½ hours, to obtain the desired hardness and bonding of the mix to the adjacent refractory lining. The patching mix can be "burned-in" by heating to within a temperature range of about 1000° F. to about 2000° F. and the time varied to obtain the desired hardness and bonding.

Unexpectedly it has been found that the mix of the invention has an indefinite shelf life. The dry mix can be stored for any length of time without showing any deterioration. If water is added to the mix of the invention immediately after blending and a portion of the mix is used, that portion of the mix which remains can be stored indefinitely. If the mix should become dry, it is only necessary to add a desired amount of water within the limits previously stated to render the mix usable as a repair material.

In a specific example of the invention, a mix comprising 1400 pounds of coke breeze, all particles of which passed a ⅛ of an inch sieve (U.S.S.), 400 pounds of fireclay having a PCE of 21 and 200 pounds of coal pitch having a softening point of 310° F., was blended with 25 gallons of water per ton of dry mix. The mix was used to line a cinder fall. The bottom of the cinder fall was covered with a coating of about 4 inches to 5 inches and the sides of the fall with a coating of about 2 inches to 3 inches by hand trowelling the mix. The time to coat the cinder fall was about ½ hour. Then iron sheet was placed over the trowelled mix. The mix was fired at a temperature of between about 1200° F. to 1800° F. for about 1 hour. The lining was in place for about 90 flushes, i.e. 90 passes of molten slag, and did not require any maintenance other than routine cleaning during this time.

In another specific example, a mix comprising 1400 pounds of coke breeze which was crushed so that about 100% of the particles passed a ⅛ of an inch sieve (U.S.S.), 300 pounds of fireclay having a PCE of 22 and 300 pounds of coal pitch having a softening point of 324° F., was blended with 20 gallons of water to a consistency of stiff cement. The mix was trowelled into an iron trough to protect the carbon blocks lining the trough. The coating of the mix in the trough was about 5 inches in thickness. An iron sheet was placed over the mix which was burned-in between at 1200° F. to 1800° F. for about 1½ hours. The mix was still in place and giving good service one month after installation.

Wherever percentages are referred to in this specification and claims such percentages are on a weight basis unless otherwise noted.

I claim:

1. A trowellable mix for repairing the refractory lining in a network of iron troughs, runners, cinder falls and spouts in a blast furnace casting floor, said mix consisting of about 60% to about 80% particles of coke breeze, about 90% of which will pass a ⅛ of an inch screen, about 10% to about 30% fireclay having a PCE of 19 to 24, about 1% up to about 20% of at least one carbonaceous material taken from the group consisting of coal pitch and petroleum pitch having a softening point within a temperature range of about 300° F. to about 340° F. and about 8% to about 16% water based on 100% of the dry mix.

2. The mix of claim 1 in which the carbonaceous material is coal pitch.

3. A trowellable mix for repairing a casting network in a blast furnace casting floor, said mix consisting of about 65% to about 75% particles of coke breeze, about 90% of which will pass a ⅛ of an inch screen, about 15% to about 25% fireclay having a PCE of 19 to 24, about 1% to about 15% of at least one carbonaceous material taken from the group consisting of coal pitch and petroleum pitch having a softening point within a temperature range of about 300° F. to about 340° F., and about 8% to about 16% water based on 100% of the dry mix.

4. The mix of claim 3 in which the carbonaceous material is coal pitch.

5. A trowellable mix for repairing a casting network in a blast furnace casting floor, said mix consisting of about 68% to about 72% particles of coke breeze, about 90% of which will pass a ⅛ of an inch screen, about 18% to about 20% fireclay having a PCE of 19 to 24, about 8% to about 12% of at least one carbonaceous material taken from the group consisting of coal pitch and petroleum pitch having a softening point within a temperature range of about 300° F. to about 340° F. and about 8% to about 16% water based on 100% of the dry mix.

6. The trowellable mix of claim 5 in which the carbonaceous material is coal pitch.

7. A trowellable, water base, high carbon mix consisting of about 60% to about 80% carbon particles 90% of which are smaller than ⅛ of an inch, about 10% to about 30% fireclay having a PCE of 19 to 24 and about 1% up to about 20% of at least one carboneaceous material taken from the group consisting of coal pitch and petroleum pitch having a softening point within a temperature range of about 300° F. to about 340° F.

8. The mix of claim 7 in which the carbon particles are coke breeze.

9. The mix of claim 7 in which the carbonaceous material is coal pitch.

10. The mix of claim 7 in which the carbonaceous material is coal pitch.

11. The mix of claim 7 in which the carbonaceous material is coal pitch having a softening point within a temperature range of about 300° F. to about 325° F.

12. The mix of claim 1 in which the carbonaceous material is coal pitch having a softening point within a temperature range of about 300° F. to about 325° F.

13. The mix of claim 3 in which the carbonaceous material is coal pitch having a softening point within a temperature range of about 300° F. to about 325 F.

References Cited

UNITED STATES PATENTS 3,303,031  2/67  Shields _____ 106—56

JAMES E. POER, Primary Examiner

U.S. Cl. X.R.

106—67